US011146554B2

(12) United States Patent
Yang et al.

(10) Patent No.: US 11,146,554 B2
(45) Date of Patent: Oct. 12, 2021

(54) SYSTEM, METHOD, AND APPARATUS FOR SECURE IDENTITY AUTHENTICATION

(71) Applicant: ALIBABA GROUP HOLDING LIMITED, Grand Cayman (KY)

(72) Inventors: Mengzhe Yang, Hangzhou (CN); Can Zhou, Hangzhou (CN); Lin Cheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 278 days.

(21) Appl. No.: 15/141,042

(22) Filed: Apr. 28, 2016

(65) Prior Publication Data

US 2016/0323278 A1    Nov. 3, 2016

(30) Foreign Application Priority Data

Apr. 30, 2015  (CN) .......................... 201510218936.6

(51) Int. Cl.
*G06F 21/00* (2013.01)
*H04L 29/06* (2006.01)
*G06F 21/44* (2013.01)

(52) U.S. Cl.
CPC .......... *H04L 63/0884* (2013.01); *G06F 21/44* (2013.01); *H04L 63/061* (2013.01);
(Continued)

(58) Field of Classification Search
CPC ............... H04L 63/0884; H04L 63/061; H04L 63/0807; G06F 21/44; G06F 2221/2129; G06F 2221/2145
(Continued)

(56) References Cited

U.S. PATENT DOCUMENTS 5,331,647 A * 7/1994 Seki ........................ H04L 43/00
714/807
7,249,379 B2 * 7/2007 Larsen ................ G06F 21/6218
709/223
(Continued)

FOREIGN PATENT DOCUMENTS

CN    102147845 A    8/2011
CN    102473221 A    5/2012
(Continued)

OTHER PUBLICATIONS

Brinch Hansen; A Concurrent; rogramming Concept; ACM 1978; p. 934-941.*
(Continued)

*Primary Examiner* — Monjur Rahim
(74) *Attorney, Agent, or Firm* — Finnegan, Henderson, Farabow, Garrett & Dunner, LLP

(57) ABSTRACT

A method for authentication is disclosed. The method may be implemented by a terminal device. The method may comprise generating, by a starting unit of the terminal device, process information of a process of the terminal device before starting the process, transmitting, by the starting unit, the process information to an authentication proxy of the terminal device, requesting, by the process, the authentication proxy to authenticate the process after the process is started, obtaining, by the authentication proxy and from system resources of the terminal device, process information corresponding to the process, and determining, by the authentication proxy, that the process is legal if the obtained process information is the same as the process information transmitted to the authentication proxy.

18 Claims, 7 Drawing Sheets

(52) U.S. Cl.
 CPC .. *H04L 63/0807* (2013.01); *G06F 2221/2129* (2013.01); *G06F 2221/2145* (2013.01)
(58) Field of Classification Search
 USPC ......................................................... 713/183
 See application file for complete search history.

(56) References Cited

U.S. PATENT DOCUMENTS

| | | | | |
|---|---|---|---|---|
| 7,684,352 | B2* | 3/2010 | Smith | H04L 45/02 370/255 |
| 8,055,527 | B1* | 11/2011 | Gil | G06Q 10/06 705/7.23 |
| 2005/0144475 | A1* | 6/2005 | Sakaki | G06F 21/55 726/26 |
| 2005/0210253 | A1* | 9/2005 | Shigeeda | H04L 9/3213 713/171 |
| 2006/0248310 | A1* | 11/2006 | Kavalam | G06F 11/3476 712/11 |
| 2008/0005397 | A1* | 1/2008 | Komatsu | G06F 11/201 710/38 |
| 2009/0193524 | A1* | 7/2009 | Shoji | G06F 21/10 726/27 |
| 2009/0249034 | A1* | 10/2009 | Sato | G06F 11/1004 712/214 |
| 2010/0175132 | A1* | 7/2010 | Zawadowskiy | G06F 21/564 726/23 |
| 2012/0166961 | A1* | 6/2012 | Frazier | G06F 17/30873 715/738 |
| 2012/0254935 | A1* | 10/2012 | Yato | H04L 9/321 726/1 |
| 2013/0091342 | A1* | 4/2013 | Liu | G06Q 10/0633 712/227 |
| 2014/0089681 | A1* | 3/2014 | Goto | G06F 21/52 713/190 |
| 2016/0283345 | A1* | 9/2016 | Gounares | G06F 17/00 |

FOREIGN PATENT DOCUMENTS

| | | |
|---|---|---|
| CN | 102521099 A | 6/2012 |
| CN | 102521101 A | 6/2012 |
| CN | 103888252 A | 5/2014 |

OTHER PUBLICATIONS

PCT International Search Report and Written Opinion dated Aug. 4, 2016, issued in corresponding International Application No. PCT/US16/29731 (8 pages).

First Search Report issued in corresponding Application No. 201510218936.6, dated Apr. 30, 2015 (1 pg.).

First Office Acton issued in corresponding Application No. 201510218936.6, by The State intellectual Property Office of People's Republic of Chirna dated Nov. 23, 2018 (10 pgs ).

* cited by examiner

400

| 401 | Process 1 of terminal 10 generates process 3's process information (first process information) and original secret key before starting process 3. Then, after starting process 3, process 1 of terminal 10 transmits the first process information and the original secret key to authentication proxy 11, and transmits the original secret key to process 3 |

| 402 | After being started, process 3 of terminal 10 uses the original second secret key to request authentication proxy 11 to authenticate process 3 |

| 403 | In response to the request, authentication proxy 11 obtains, from terminal 10's system resources, process information of process 3 (second process information), and determines if the first process information is the same as the second process information. If the determination result is yes, authentication proxy 11 determines that process 3 is legal |

| 404 | Authentication proxy 11 generates a first secret key for process 3 and transmits the first secret key to process 3 |

Fig. 4

SYSTEM, METHOD, AND APPARATUS FOR SECURE IDENTITY AUTHENTICATION

CROSS REFERENCE TO RELATED APPLICATION

The present application is based on and claims the benefits of priority to Chinese Application No. 201510218936.6, filed Apr. 30, 2015, the entire contents of which are incorporated herein by reference.

TECHNICAL FIELD

The present application relates to methods, apparatus, and systems for secure identity authentication.

BACKGROUND

In a distributed computing environment, processes on different terminal devices communicate with one another via a network. Since the network is open and insecure, the inter-process communications cannot be guaranteed safe. Hackers may break into the distributed computing environment and use illegal processes to communicate with legal processes.

To ensure network security and to prevent such hacking threats, authentication of each communication process can be implemented before the communication starts.

Existing technologies, however, have at least a number of drawbacks. Existing authentication protocols mostly authenticate users for particular applications. Common users can be authenticated through an internet authentication protocol to obtain communication keys. However, since the internet network is open and insecure, hackers' illegal processes may pass the authentication and obtain the communication keys. Therefore, existing authentication solutions may not be secure.

SUMMARY

One aspect of the present disclosure is directed to a method for authentication. The method may be implemented by a terminal device. The method may comprise generating, by a starting unit of the terminal process, process information of a process of the terminal device before starting the process, transmitting, by the starting unit the process information to an authentication proxy of the terminal device, requesting, by the process, the authentication proxy to authenticate the process after the process is started, obtaining, by the authentication proxy and from system resources of the terminal device, process information corresponding to the process, and determining, by the authentication proxy, that the process is legal if the obtained process information matches the process information transmitted to the authentication proxy.

Another aspect of the present disclosure is directed to a non-transitory computer-readable medium storing one or more programs, the one or more programs comprising instructions which, when executed by a processor of a first computer system, cause the first computer system to perform a method. The method may comprise generating, by a starting unit of the first computer system, first process information of a process of the first computer system before starting the process, transmitting, by the starting unit, the process information to an authentication proxy of the first computer system, requesting, by the process, the authentication proxy to authenticate the process, obtaining, by the authentication proxy and from the first computer system, process information corresponding to the process, determining, by the authentication proxy, that the process is legal if the obtained process information matches the process information transmitted to the authentication proxy.

Another aspect of the present disclosure is directed to an apparatus for authentication. The apparatus may be in a distributed computer environment. The apparatus may include an authentication proxy, a starting unit, and a process. The starting unit may be configured to generate process information of the process before starting the process, and transmit the process information to the authentication proxy. The process may be configured to request the authentication proxy to authenticate the process. The authentication proxy may be configured to, in response to the request, obtain, from the apparatus, process information of the process, determine that the process is legal if the obtained process information matches the process information transmitted to the authentication proxy.

Another aspect of the present disclosure is directed to a method for authentication. The method may comprise receiving, by an authentication proxy of a terminal device, process information of a process before starting the process, and authenticating, by the authentication proxy of the terminal device, the process after the process is started. Authenticating the process may comprise obtaining, by the authentication proxy and from the terminal device, process information corresponding to the process, and determining, by the authentication proxy, that the process is legal, if the obtained process information matches the process information transmitted to the authentication proxy.

A further aspect of the present disclosure is directed to a method for authentication implemented by a terminal device. The method may include generating, by the terminal device, process information of a process of the terminal device before starting the process, after the process is started, requesting, by the process, the terminal device to authenticate the process, obtaining, by the terminal device, process information corresponding to the process, and determining, by the terminal device, that the process is legal, if the obtained process information matches the process information generated by the terminal device. The process information of a process includes at least one of a process ID of the process, an access path of the process's execution file, or a signature value of the process's execution file.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 4 is a flow diagram illustrating another method for secure authentication, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
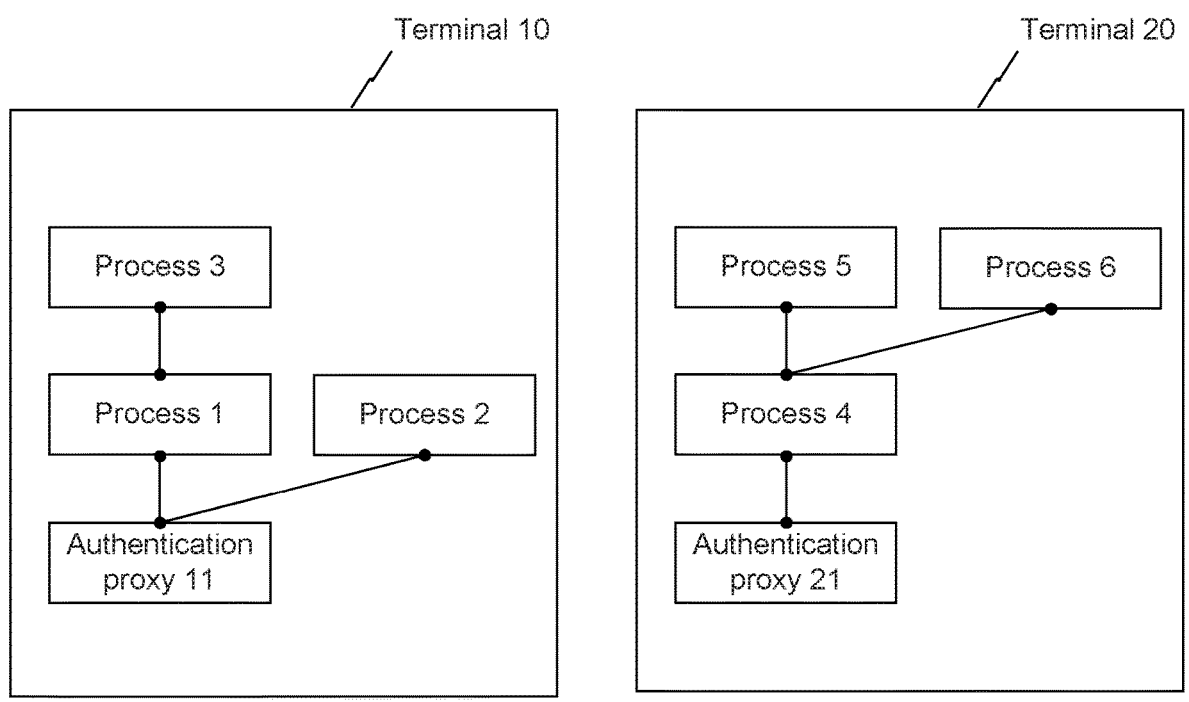
FIG. 1 is a block diagram illustrating a system for secure authentication, according to an exemplary embodiment.

FIG. 1 is a block diagram illustrating a system 100 for secure authentication, according to an exemplary embodiment. System 100 may include one or more terminal devices, for example, terminal 10 and terminal 20. Terminal 10 may include an authentication proxy 11 to perform identify authentications for processes (e.g., applications, programs) implemented on terminal 10. Processes may be interchangeable with computer programs, or instructions stored in computer-readable storage medium. Terminal 20 may include an authentication proxy 21 to perform identify authentications for processes implemented on terminal 20. In some embodiments, terminal 10, e.g. a computer or a mobile phone, may have 3 legal processes (i.e., processes 1-3). Authentication proxy 11 may start processes 1 and 2. Process 1 may start process 3, i.e., process 1 is process 3's parent process and process 3 is process 1's child process. Terminal 20 may have 3 legal processes (i.e., processes 4-6). Authentication proxy 21 may start process 4. Process 4 may start processes 5 and 6, i.e., process 4 is processes 5 and 6's parent process and processes 5 and 6 are process 4's child processes. Steps and method performed by system 100 may be described below.

Figure 2:
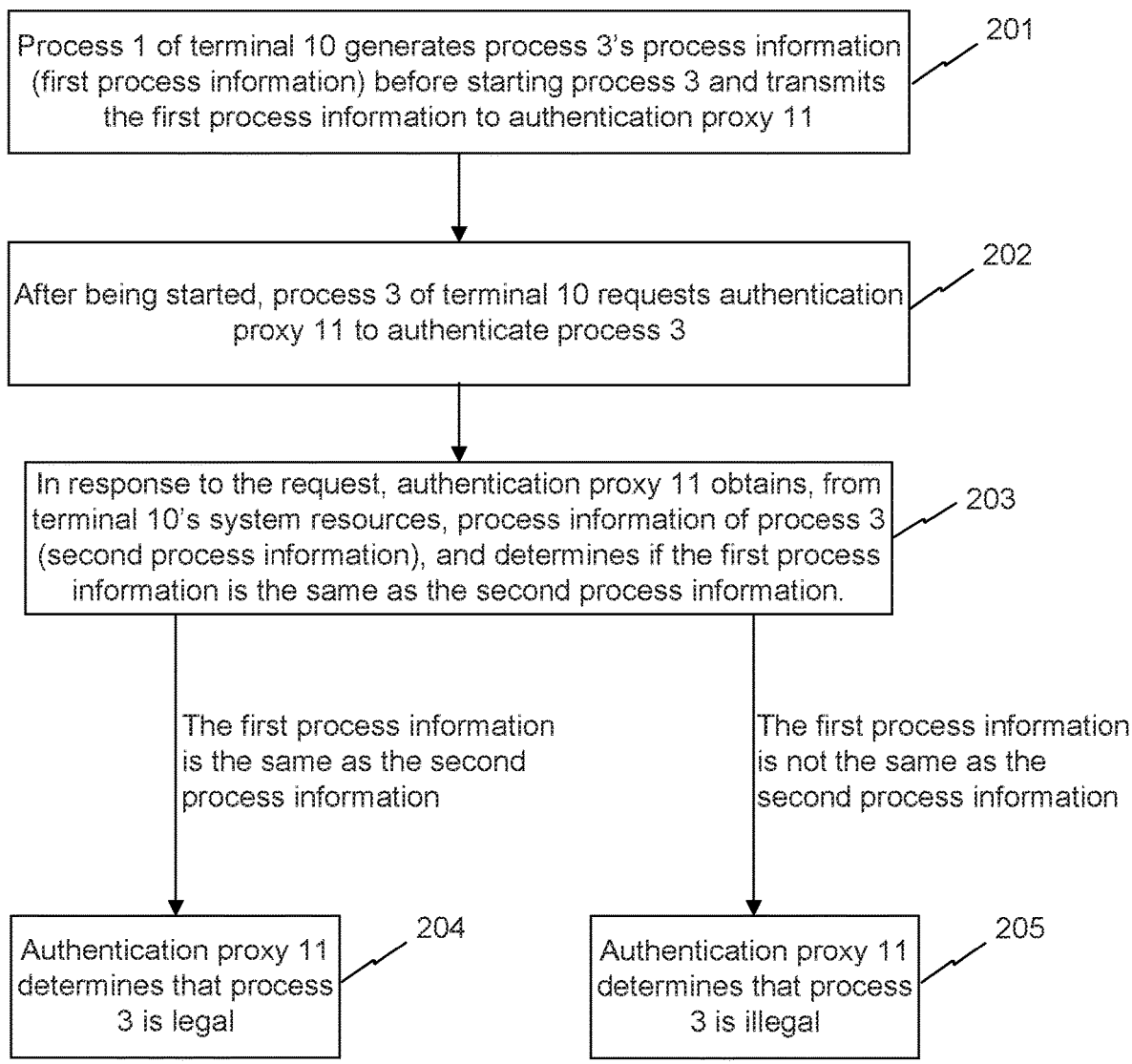
FIG. 2 is a flow diagram illustrating a method for secure authentication, according to an exemplary embodiment.

FIG. 2 is a flow diagram illustrating a method 200 for secure authentication, according to an exemplary embodiment. Method 200 may be applicable to, for example, process 3 of terminal 10. Method 200 may be implemented by a terminal device, e.g. terminal 10. Terminal 10 may be a computer system comprising a processor and a non-transitory computer-readable storage medium storing instructions. Method 200 may include a number of steps, some of which may be optional.

Step 201: process 1 of terminal 10 generates process 3's process information (can be called first process information) before starting process 3 and transmits the first process information to authentication proxy 11.

The first process information may include at least one of a process ID (PID) of process 3, an access path of process 3's execution file, or a signature value of process 3's execution file.

In some embodiments, process 1 can calculate the signature value with a preset algorithm. For example, if the signature value is a sha1 value, process 1 can calculate the signature value by using a sha1sum command in linux system.

In one example, processor 3's process information includes:

PID: 14632 access path of execution file: /bin/sleep sha1 value of execution file: 5bbc30bb0b086b587d2a55b93d5cdbe6fb03cc3f In addition to process 3's process information, other started processes' process information of terminal 10 may also be transmitted to authentication proxy 11. Authentication proxy 11 may maintain all process information of started processes in terminal 10. The transmission may be performed by a starting unit included in the processes.

Step 202: after being started, process 3 of terminal 10 requests authentication proxy 11 to authenticate process 3. The request may be implemented by linux's domainsocket method in communication with authentication proxy 11.

Step 203: in response to the request, authentication proxy 11 obtains, from terminal 10's system resources, process information corresponding to process 3 (can be called second process information, and the second process information may be the same as the first process information), and determines if the first process information is the same as the second process information. If the determination is yes, the method proceeds to step 204. If the determination is no, the method proceeds to step 205.

Step 204: authentication proxy 11 determines that process 3 is legal. The method ends.

Step 205: authentication proxy 11 determines that process 3 is illegal. The method ends.

In some embodiments, after receiving the request of step 202, authentication proxy 11 may obtain, through linux's getsockopt interface and SO_PEERCRED parameter, processor 3's PID, from a kernel. Authentication proxy 11 may also obtain, based on process 3's PID and from /proc file system, an access path of process 3's execution file. Authentication proxy 11 may also calculate a signature value of the execution file with a preset signature value calculation algorithm.

In some embodiments, if a real process 3 requests authentication from authentication proxy 11, authentication proxy 11 obtains the real process 3's process information from terminal 10's system resources. By a comparison, the real process 3's process information matches with process information transmitted by process 1, and it can be confirmed that the real process 3 is started by process 1, i.e., the real process 3 is legal and is an authenticated process.

In some embodiments, if a fake process 3 requests authentication from authentication proxy 11, authentication proxy 11 obtains the fake process 3's process information from terminal 10's system resources. By a comparison, the fake process 3's process information does not match with process information transmitted by process 1, and it can be confirmed that the fake process 3 is not started by process 1, i.e., the fake process 3 is illegal.

Authentication proxy 11 can compare obtained process information, e.g., process 3's information, with all process information maintained by authentication proxy 11. If any match from the comparison is identified, process 3 can be determined to be legal. If no match from the comparison is identified, process 3 can be determined to be illegal.

Figure 3:
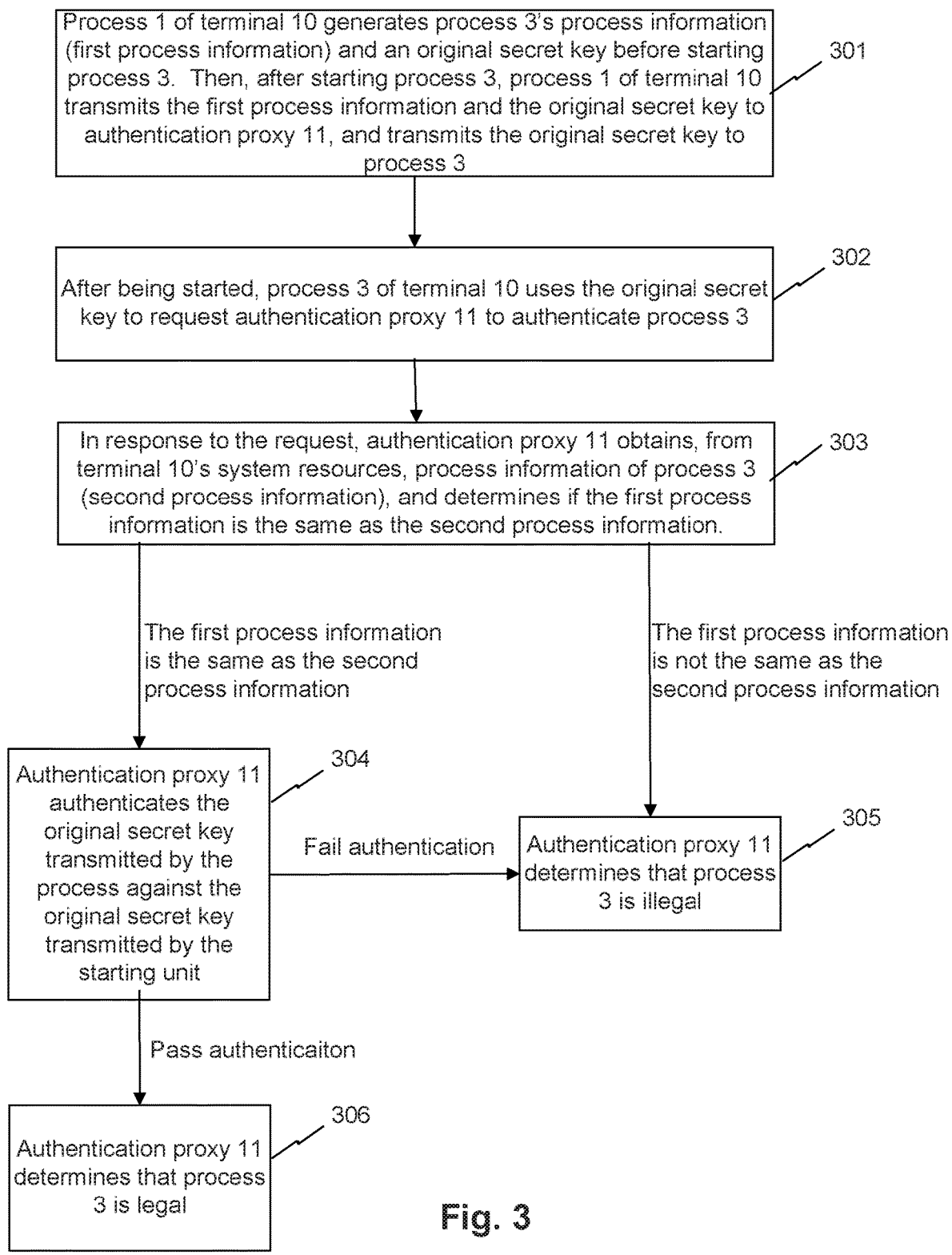
FIG. 3 is a flow diagram illustrating another method for secure authentication, according to an exemplary embodiment.

FIG. 3 is a flow diagram illustrating another method 300 for secure authentication, according to an exemplary embodiment. Method 300 may be implemented by a terminal device, e.g. terminal 10. The terminal device 10 may be a computer system comprising a processor and a non-transitory computer-readable storage medium storing instructions. Method 300 may include a number of steps, some of which may be optional.

Step 301: process 1 of terminal 10 generates process 3's process information (first process information) and an original secret key before starting process 3 and transmits the first process information and the original secret key to authentication proxy 11. After starting process 3, process 1 transmits the original secret key to process 3.

Step 302: after being started, process 3 of terminal 10 uses the original secret key to request authentication proxy 11 to authenticate process 3.

Step 303: in response to the request, authentication proxy 11 obtains, from terminal 10's system resources, process information of process 3 (second process information), and determines if the second process information is the same as the first process information. If the determination is yes, the method proceeds to step 304. If the determination is no, the method proceeds to step 305.

Step 304: authentication proxy 11 authenticates the original secret key transmitted by the process against the original secret key transmitted by the starting unit. If the authentication is positive, the method proceeds to step 306. If the authentication is negative, the method proceeds to step 305. The authentication can be implemented by Message Authentication Code (MAC) or Authenticated Encryption.

Step 305: authentication proxy 11 determines that process 3 is illegal. The method ends.

Step 306: authentication proxy 11 determines that process 3 is legal. The method ends.

In method 300, in addition to comparing process information, an authentication proxy may compare secret keys, to improve security. Thus, the authentication result can be more reliable and the authentication process can be more secure.

In some exemplary embodiments, a secret key's lifetime can be set to once, e.g., the original secret key of process 3 may expire after the first use. Even if an illegal process obtains a secret key of a legal process, the illegal process may not be able to use the secret key to pass an authentication by an authentication proxy, since the secret key expires after the first use.

In some exemplary embodiments, authentication proxy 11 can establish a corresponding relationship between process 3's process information transmitted by process 1 (first process information) and the original secret key. In response to the authentication request by process 3, authentication proxy 11 can search, from process information maintained by authentication proxy 11, for matching process information to the original secret key, to obtain process 3's process information. Thus, authentication proxy 11 can compare the obtained process information with the first process information. This can reduce time in search and facilitate the authentication process. In some embodiments, after process 3's secret key expires, authentication proxy 11 may cancel the corresponding relationship between process 3's process information transmitted by process 1 (first process information) and the original secret key.

In some exemplary embodiments, in addition to process 3, other processes on terminal 10 can be authenticated, for example, process 1 and process 2. Since process 1 and process 2 are started by authentication proxy 11, authentication proxy 11 can generate corresponding process information and secret keys.

In some exemplary embodiments, in terminal 10, all processes authenticated by authentication proxy 11 may be recorded. Accordingly, a tree relationship structure can be established, with the root being authentication proxy 11 and branching to processes started by the root and so forth (i.e., the tree relationship structure may have a root and many nodes, with each node, representing a process, may branch to processes started by the process). A path tracing from a node to the root may represent the only identification of the node (i.e. the process represented by the node).

Authentication proxy 11 may determine a path of process 3, the path tracing process 3 to authentication proxy 11 in the tree relationship structure being the only identification of process 3. For example, process 3's identification is: process 3@process 1@authentication proxy 11; process 1's identification is: process 1@authentication proxy 11; and process 2's identification is: process 2@authentication proxy 11.

Similarly, process 5's identification can be: process 5@process 4@authentication proxy 21; process 6's identification is: process 6@process 4@authentication proxy 21.

FIG. 4 is a flow diagram illustrating another method 400 for secure authentication, according to an exemplary embodiment. Method 400 may be implemented by a terminal device, e.g. terminal 10. The terminal device 10 may be a computer system comprising a processor and a non-transitory computer-readable storage medium storing instructions. Method 400 may include a number of steps, some of which may be optional.

In some exemplary embodiments, after determining that process 3 is legal, authentication proxy 11 may negotiate an original secret key with process 3. The original secret key can be used for communication between process 3 and authentication proxy 11, so that process 3 can communicate with other processes through authentication proxy 11. The original secret key can be implemented by multiple methods, including, for example, Diffie-Hellman key exchange.

At step 401, process 1 of terminal 10 generates process 3's process information (first process information) and an original secret key before starting process 3, and transmits the first process information and the original secret key to authentication proxy 11. After starting process 3, process 1 transmits the first secret key to process 3.

At step 402, after being started, process 3 of terminal 10 uses the original secret key to request authentication proxy 11 to authenticate process 3.

At step 403, in response to the request, authentication proxy 11 obtains, from terminal 10's system resources, process information (second process information), and original secret key of process 3 and determines if the second process information is the same as the first process information, and compare the original secret key transmitted by the process with the original secret key transmitted by the starting unit to determine whether they are the same. If the determination results for the process information and secret key both are yes, i.e., the second process information is the same as the first process information and the second secret key is the same as the first secret key, authentication proxy 11 determines that process 3 is legal.

At step 404, authentication proxy 11 generates a first secret key for process 3 and transmits the first secret key to process 3.

Figure 5:
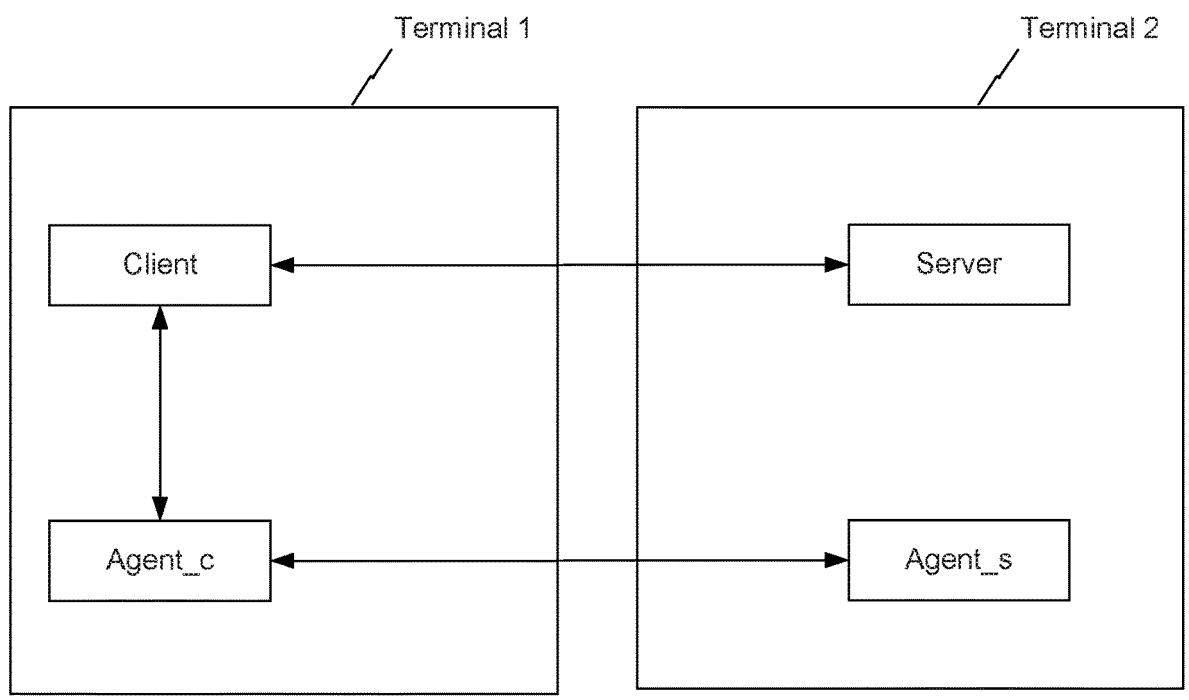
FIG. 5 is a block diagram illustrating a system for secret key negotiation, according to an exemplary embodiment.

FIG. 5 is a block diagram illustrating a system 500 for secret key negotiation, according to an exemplary embodiment. System 500 may include terminal 1 and terminal 2.

In some exemplary embodiments, terminal 1 may include a client process and terminal 2 may include a server process. The client process and the server process may both be authenticated. The client process may have obtained a first secret key, i.e., client_key for secure communication with agent_c, which is included in terminal 1. Similarly, the server process may have obtained a second secret key, i.e., server_key for secure communication with agent_s, which is included in terminal 2.

In some exemplary embodiments, when the client process communicates with the server process, inter-process communication can be illustrated below with reference to FIG. 6.

Figure 6:
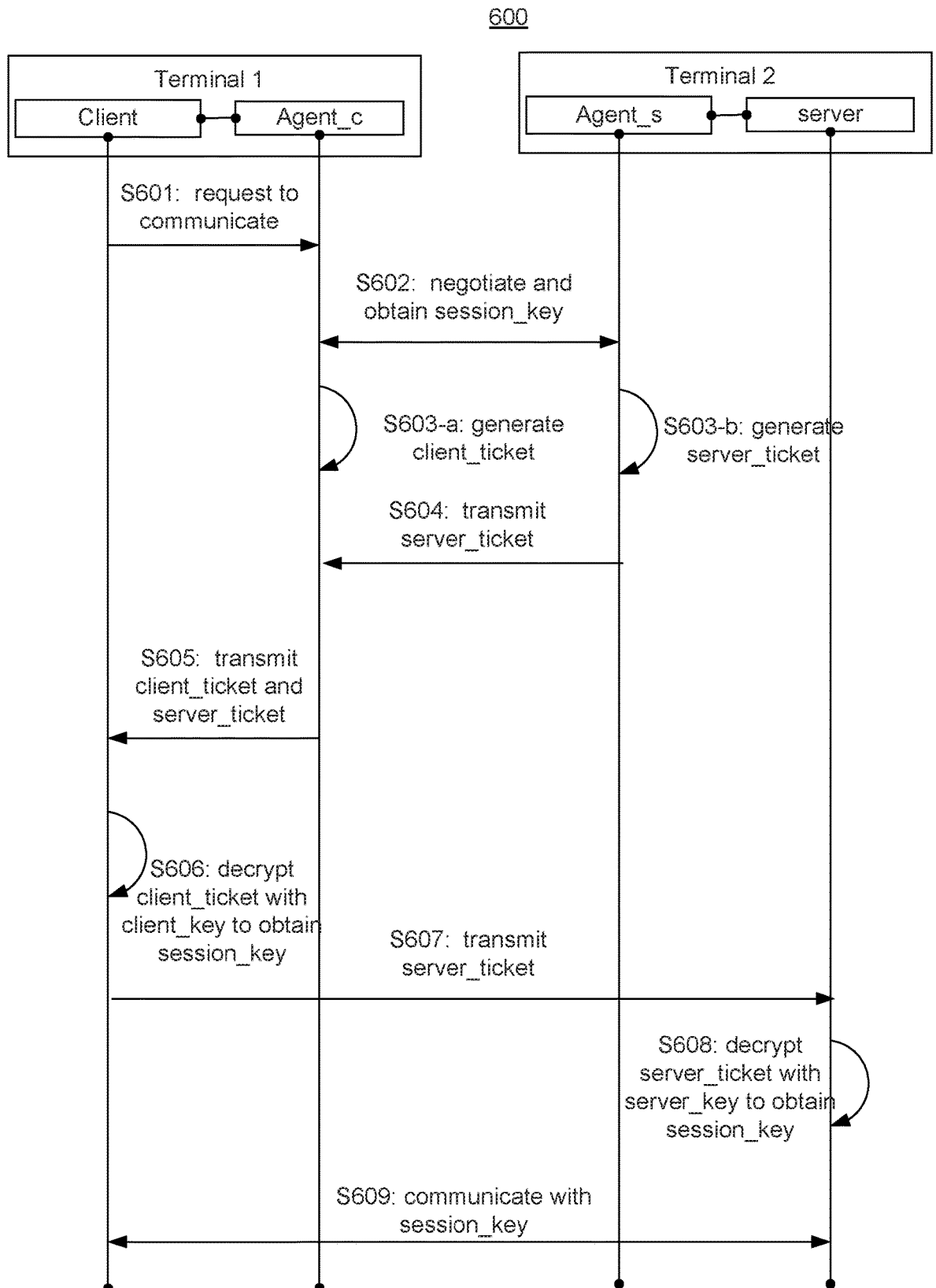
FIG. 6 is a flow diagram illustrating a method for inter-process communication, according to an exemplary embodiment.

FIG. 6 is a flow diagram illustrating a method 600 for inter-process communication, according to an exemplary embodiment. Method 600 may be implemented by terminal devices, e.g. terminal 1 and terminal 2. Method 600 may also be implemented by one or more computer systems comprising one or more processors and non-transitory computer-readable storage medium storing instructions. Method 600 may include a number of steps, some of which may be optional.

Step 601: the client process of terminal 1 communicates with agent_c of terminal 1 and requests to communicate with server process of terminal 2.

Step 602: agent_c communicates with agent_s of terminal 2 to negotiate and obtain session_key.

Step 603: agent_c generates client_ticket, agent_s generates server_ticket, and client_ticket=Encrypt (session_key, client_key), i.e., session_key is encrypted with client_key. Similarly, server_ticket=Encrypt (session_key, server_key), i.e., session_key is encrypted with server_key.

Step 604: agent_s transmits server_ticket to agent_c.

Step 605: agent_c transmits client_ticket and server_ticket to the client process.

Step 606: the client process obtains client_key and decrypts client_ticket with client_key to obtain session_key.

Step 607: the client process transmits server_ticket to the server process.

Step 608: the server process obtains server_key and decrypts server_ticket with server_key to obtain session_key.

Step 609: the client process communicates with the server process, the communication being encrypted with session_key.

In some embodiments, after the authentication, the client process may obtain a unique identification client_info and the server process may obtain a unique identification server_info.

In step 602 described above, client_ticket and server_ticket can also be generated by: client_ticket=Encrypt (session_key+server_info, client_key), i.e., session_key and server_info are encrypted with client_key, and server_ticket=Encrypt (session_key+client_info, server_key), i.e., session_key and client_info are encrypted with server_key.

Correspondingly, at step 606, the client process may decrypt client_ticket with client_key to obtain session_key and server_info, and at step 608, the server process may decrypt server_ticket with server_key to obtain session_key and client_info.

Before step 609, the client process may determine if the server process is the expected communication target based on obtained server_info, and the server process can determine if the client process is the expected communication target based on obtained client_info. If the client process determines that the server process is the expected communication target, at step 608, the client process may transmit a message to the server process through session_key. If the client process determines that the server process is not the expected communication target, the client process may not transmit a message to the server process. When the client process sending the message to server process and if the server process determines that the client process is the expected communication target, the server process may respond to the client process. Otherwise, the server process may not respond to the client process.

As illustrated above, a terminal device may authenticate a process included in the terminal device by an authentication proxy included in the terminal device. Before being started, the process, e.g. the process's starting unit, may report corresponding process information to the authentication proxy. The reported process information may be recorded on a "white list" in the authentication proxy. During authentication, the authentication proxy may retrieve, from system resources of the terminal device, process information of a process to be authenticated, and determine if the process information is to be authenticated is on the "white list." If the process is legal, its process information can be on the "white list." Illegal processes' process information cannot be on the "white list." Thus, the authentication process can be secured.

Figure 7:
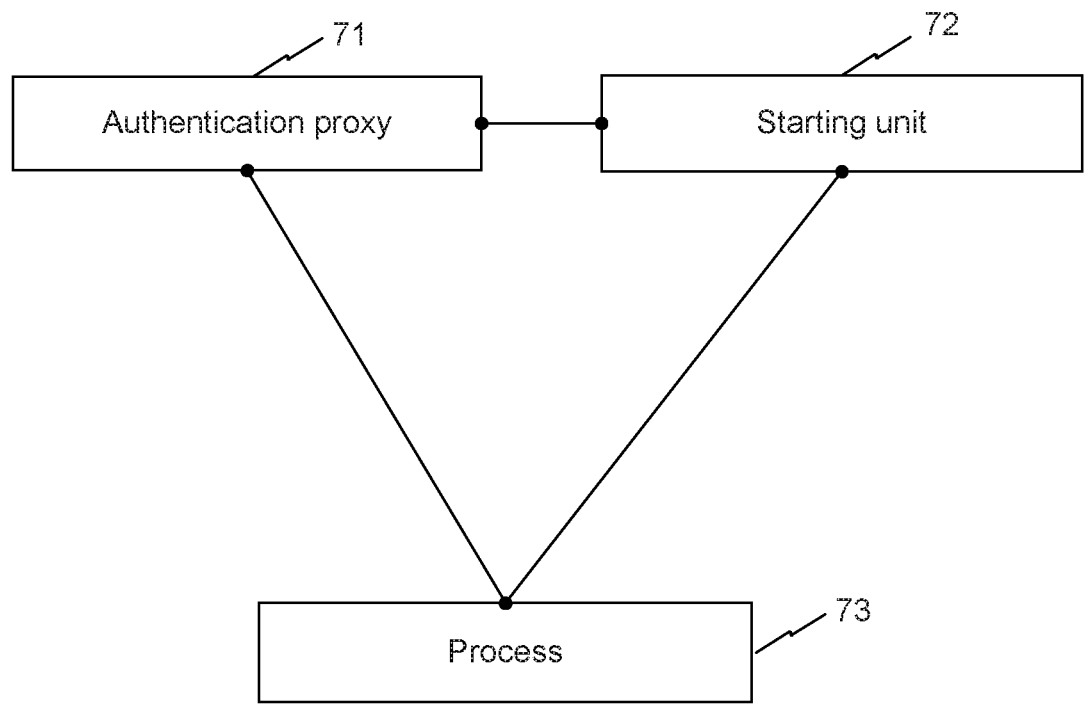
FIG. 7 is a block diagram illustrating an apparatus for secure authentication, according to an exemplary embodiment.

FIG. 7 is a block diagram illustrating an apparatus 700 for secure authentication, according to an exemplary embodiment. Apparatus 700 may be a terminal device in a distributed computing environment. Apparatus 700 may include an authentication proxy 71, a starting unit 72, and a process 73.

Starting unit 72 may be configured to generate process 73's process information (first process information) before starting process 73 and to transmit the first process information to authentication proxy 71.

Process 73 may be configured to request authentication proxy 71 to authenticate process 73 after it is started.

Authentication proxy 71 may be configured to, in response to the request, obtain, from system resources, process information of process 73 (second process information), and determine if the first process information is the same as the second process information. If the determination is yes, authentication proxy 71 determines that process 73 is legal. If the determination is no, the method determines that process 73 is illegal.

The process information may include at least one of a process ID (PID) of process 73, an access path of process 73's execution file, or a signature value of process 73's execution file.

In some embodiments, starting unit 72 may be configured to generate process 73's secret key (the original secret key) and to transmit the original secret key to authentication proxy 71. Then, after starting process 73, starting unit 72 may be further configured to transmit the original secret key to process 73. Authentication proxy 71 may be configured to authenticate a second secret key transmitted by process 73 against the original secret key transmitted by the starting unit. If the authentication is positive, authentication proxy 71 may be configured to determine that process 73 is legal. If the authentication is negative, authentication proxy 71 may be configured to determine that process 73 is illegal.

Process 73 may be configured to, after being started, request authentication proxy 71 to authenticate process 73.

In some exemplary embodiments, a secret key's lifetime can be set to once.

In some exemplary embodiments, authentication proxy 71 may be configured to determine a path tracing process 73 to authentication proxy 71 according to a tree relationship described above, and to use the path as the only identification of process 73.

In some exemplary embodiments, authentication proxy 71 may be further configured to, after determining that process 73 is legal, negotiate a first secret key with process 73. The first secret key can be used for communication between process 73 and authentication proxy 71.

In some exemplary embodiments, process 73 may be configured to communicate with authentication proxy 71, request communication with a target process, receive a first ticket from authentication proxy 71, decrypt the first ticket with a first secret key, obtain a communication secret key, and communicate with the target process with the communication secret key.

Authentication proxy 71 may be configured to, in response to the request, negotiate the communication secret key with another authentication proxy on a terminal device of the target process, encrypt the communication key with the first secret key to obtain the first ticket, and transmit the first ticket to process 73.

In some exemplary embodiments, authentication proxy 71 may be further configured to, after the negotiation, receive a second ticket transmitted by the authentication proxy on the terminal device of the target process (i.e., the target authentication proxy), and transmit the second ticket to process 73, the second ticket obtained by encrypting the communication secret key with the second secret key, and the second secret key being used for communication between the target process and the authentication proxy on the terminal device of the target process.

Process 73 may be further configured to transmit the second ticket to the target process, so that the target process can decrypt the second ticket to obtain the communication secret key.

In some exemplary embodiments, authentication proxy 71 may be further configured to obtain an identification of the target process from the authentication proxy on the terminal device of the target process.

Authentication proxy 71 may be configured to encrypt the communication secret key and the identification of the target process with the first secret key to obtain a first ticket, and transmit the first ticket to process 73.

Process 73 may be configured to decrypt the first ticket with the first secret key to obtain the communication secret key and the identification of the target process.

In some exemplary embodiments, process 73 may be further configured to, before communicating with the target process with the communication secret key, determine if the target process is an expected communication target based on the identification of the target process. If the determination result is yes, process 73 may be configured to communicate with the target process with the communication secret key.

As illustrated above, a terminal device may authenticate a process included in the terminal device by an authentication proxy included in the terminal device. Before being started, the process, e.g. the process's starting unit, may report corresponding process information to the authentication proxy. The reported process information may be recorded on a "white list" in the authentication proxy. During authentication, the authentication proxy may retrieve, from system resources of the terminal device, process information of a process to be authenticated, and determine if the process information is to be authenticated is on the "white list." If the process is legal, its process information can be on the "white list." Illegal processes' process information cannot be on the "white list." Thus, the authentication process can be secured.

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for secure identity authentication. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for authentication, implemented by a terminal device, comprising:
   generating, by a parent process of the terminal device, process information of a process of the terminal device before starting the process;
   transmitting, by the parent process, the process information to an authentication proxy of the terminal device;
   after the process is started, requesting, by the process, the authentication proxy to authenticate the process;
   determining, by the authentication proxy, a path tracing the process to the authentication proxy, wherein the path comprises the parent process and the process;
   obtaining, by the authentication proxy and from the terminal device, process information corresponding to the process, wherein the process information corresponding to the process comprises the path tracing the process to the authentication proxy; and
   determining, by the authentication proxy, that the process is authenticated, if the obtained process information corresponding to the process that has been started matches the process information transmitted to the authentication proxy before the process having been started.

2. The method for authentication of claim 1, wherein the process information includes at least one of a process ID of the process, an access path of the process's execution file, or a signature value of the process's execution file.

3. The method for authentication of claim 1, further comprising:
   generating, by the parent process, an original secret key of the process;
   transmitting, by the parent process, the original secret key to the authentication proxy;
   starting, by the parent process, the process;
   transmitting, by the parent process, the original secret key to the process;
   authenticating, by the authentication proxy, a secret key transmitted by the process against the original secret key transmitted by the parent process; and
   determining that the process is legal, if the authentication is passed.

4. The method for authentication of claim 1, further comprising:
   using, by the authentication proxy, the path as the only identification of the process.

5. The method for authentication of claim 1, further comprising negotiating, by the authentication proxy, a first secret key for secure communication between the authentication proxy and the process, if the process is determined legal.

6. The method for authentication of claim 5, further comprising:
  requesting, by the process, communication with a target process on a second terminal device;
  negotiating, by the authentication proxy, a communication secret key with a target authentication proxy of the second terminal device, in response to the request;
  encrypting, by the authentication proxy, the communication secret key with the first secret key to obtain a first ticket;
  transmitting, by the authentication proxy, the first ticket to the process; and
  decrypting, by the process, the first ticket with the first secret key to obtain the communication secret key for secure communication between the process and the target process.

7. The method for authentication of claim 6, further comprising:
  after negotiating the communication secret key with the target authentication proxy of the second terminal device, receiving, by the authentication proxy, a second ticket transmitted by the target authentication proxy; and
  transmitting, by the authentication proxy, the second ticket to the process, the second ticket being obtained by encrypting the communication secret key with the second secret key, and the second secret key being used for communication between the target process and the target authentication proxy.

8. The method for authentication of claim 6, further comprising obtaining, by the authentication proxy, an identification of the target process from the target authentication proxy, and wherein:
  encrypting, by the authentication proxy, the communication secret key with the first secret key to obtain the first ticket comprises encrypting, by the authentication proxy, the communication secret key and the identification of the target process with the first secret key to obtain a first ticket and transmitting the first ticket to the process, and
  decrypting, by the process, the first ticket with the first secret key to obtain the communication secret key comprises decrypting, by the process, the first ticket with the first secret key to obtain the communication secret key and the identification.

9. The method for authentication of claim 8, further comprising:
  before communicating with the target process with the communication secret key, determining, by the process, if the target process is an expected communication target based on the identification of the target process; and
  communicating, by the process, with the target process with the communication secret key, if the target process is the expected communication target.

10. A non-transitory computer-readable medium storing one or more programs, the one or more programs comprising instructions which, when executed by a processor of a first terminal device, cause the first terminal device to perform a method comprising:
  generating, by a parent process of the first terminal device, process information of a process of the first computer system before starting the process;
  transmitting, by the parent process, the process information to an authentication proxy of the first terminal device;
  after the process is started, requesting, by the process, the authentication proxy to authenticate the process;
  determining, by the authentication proxy, a path tracing the process to the authentication proxy, wherein the path comprises the parent process and the process;
  obtaining, by the authentication proxy and from the first terminal device, process information corresponding to the process; and
  determining, by the authentication proxy, that the process is authenticated, if the obtained process information corresponding to the process that has been started matches the process information transmitted to the authentication proxy before the process having been started.

11. The non-transitory computer-readable medium of claim 10, wherein the process information includes at least one of a process ID of the process, an access path of the process's execution file, or a signature value of the process's execution file.

12. The non-transitory computer-readable medium of claim 10, wherein the method further comprises:
  generating, by the parent process, an original secret key of the process;
  transmitting, by the parent process, the original secret key to the authentication proxy;
  starting, by the parent process, the process;
  transmitting, by the original secret key to the process;
  authenticating, by the authentication proxy, a secret key transmitted by the process against the original secret key transmitted by the parent process; and
  determining that the process is legal, if the authentication is passed.

13. The non-transitory computer-readable medium of claim 10, further comprising:
  using, by the authentication proxy, the path as the only identification of the process.

14. The non-transitory computer-readable medium of claim 10, further comprising:
  negotiating, by the authentication proxy, a first secret key for secure communication between the authentication proxy and the process, if the process is determined legal;
  requesting, by the process, communication with a target process on a second terminal device;
  negotiating, by the authentication proxy, a communication secret key with a target authentication proxy of the second terminal device;
  encrypting, by the authentication proxy, the communication secret key with the first secret key to obtain a first ticket;
  transmitting, by the authentication proxy, the first ticket to the process; and
  decrypting, by the process, the first ticket with the first secret key to obtain the communication secret key for secure communication between the process and the target process.

15. The non-transitory computer-readable medium of claim 14, further comprising:

after negotiating the communication secret key with the target authentication proxy of the second terminal device, receiving, by the authentication proxy, a second ticket transmitted by the target authentication proxy; and transmitting, by the authentication proxy, the second ticket to the process, the second ticket being obtained by encrypting the communication secret key with the second secret key, and the second secret key being used for communication between the target process and the target authentication proxy;

obtaining, by the authentication proxy, an identification of the target process from the target authentication proxy, and wherein:

encrypting, by the authentication proxy, the communication secret key with the first secret key to obtain the first ticket comprises encrypting, by the authentication proxy, the communication secret key and the identification of the target process with the first secret key to obtain a first ticket and transmitting the first ticket to the process, and decrypting, by the process, the first ticket with the first secret key to obtain the communication secret key comprises decrypting, by the process, the first ticket with the first secret key to obtain the communication secret key and the identification.

16. The non-transitory computer-readable medium of claim 15, further comprising:

before communicating with the target process with the communication secret key, determining, by the process, if the target process is an expected communication target based on the identification of the target process; and communicating, by the process, with the target process with the communication secret key, if the target process is the expected communication target.

17. A method for authentication, implemented by a terminal device, comprising:

generating, by the terminal device, process information of a process of the terminal device before starting the process;

after the process is started, requesting, by the process, the terminal device to authenticate the process;

determining, by the terminal process, a path tracing the process to an authentication proxy, wherein the path comprises the process and a parent process corresponding to the process;

obtaining, by the terminal device, process information corresponding to the process, wherein the process information corresponding to the process comprises the path tracing the process to the authentication proxy; and determining, by the terminal device, that the process is authenticated, if the obtained process information corresponding to the process that has been started matches the process information generated by the terminal device before the process having been started.

18. A method for authentication, comprising:

receiving, by an authentication proxy of a terminal device, process information of a process before starting the process; and authenticating, by the authentication proxy of the terminal device, the process after the process is started, wherein authenticating the process comprises:

determining, by the authentication proxy, a path tracing the process to the authentication proxy, wherein the path comprises the process and a parent process corresponding to the process;

obtaining, by the authentication proxy and from the terminal device, process information corresponding to the process, wherein the process information corresponding to the process comprises the path tracing the process to the authentication proxy; and determining, by the authentication proxy, that the process is authenticated, if the obtained process information corresponding to the process that has been started matches the process information transmitted to the authentication proxy before the process having been started.

* * * * *